No. 691,371. Patented Jan. 21, 1902.
C. W. FOSTER.
APPARATUS FOR DELIVERING MELTED GLASS.
(Application filed Apr. 11, 1901.)
(No Model.)
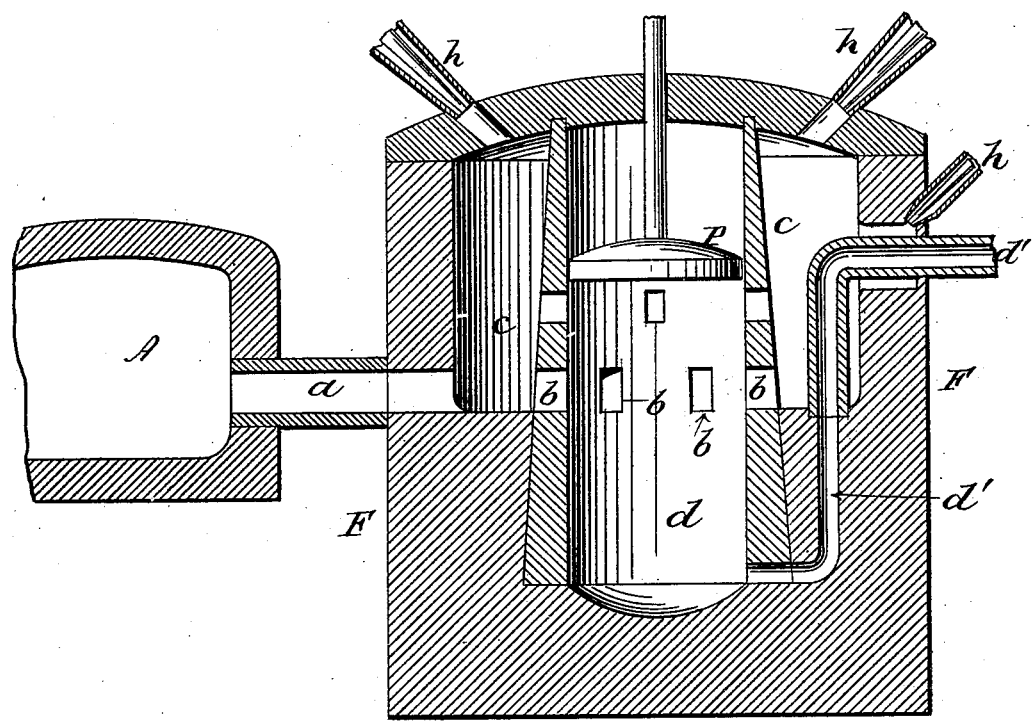
Witnesses:
D. W. Gardner
J. C. Cowles
Inventor:
Charles W. Foster
By his attorney
Geo. Wm. Miatt

UNITED STATES PATENT OFFICE.

CHARLES W. FOSTER, OF NEW YORK, N. Y.

APPARATUS FOR DELIVERING MELTED GLASS.

SPECIFICATION forming part of Letters Patent No. 691,371, dated January 21, 1902.

Application filed April 11, 1901. Serial No. 55,391. (No model.)

*To all whom it may concern:*

Be it known that I, CHARLES W. FOSTER, a citizen of the United States, residing in the city, county, and State of New York, have invented certain new and useful Improvements in Apparatus for Delivering Melted Glass, of which the following is a specification sufficient to enable others skilled in the art to which the invention appertains to make and use the same.

My invention relates to means for effecting the delivery of molten glass from a primary furnace for use in the various manufactures of glass; and it consists in the combination and arrangement of parts hereinafter described and claimed specifically.

A represents symbolically any suitable form of melting-furnace in which the glass is rendered fluid. The glass flows from the melting-chamber A through the conduit $a$ into the annular chamber $c$ of the supplemental furnace F and from thence into the discharge-cylinder $d$ through the ports $b\ b$.

$d'$ is a discharge-passage opening into the lower portion of the discharge-cylinder $d$ and extending above the plane of the conduit $a$ from the melting-furnace A.

P is a plunger or piston for forcibly ejecting the glass from the discharge cylinder or chamber $d$, the side walls of which guide and sustain the plunger laterally. It is obvious that the discharge-chamber $d$ and the plunger or piston need not necessarily be cylindrical in form, although that configuration is preferable.

The descent of the plunger P closes the ports $b\ b$ and forces the liquid glass through the discharge-passage $d'$ at a speed and pressure capable of regulation by well-known means. Upon the retractile movement of the plunger P the melted glass in the discharge-passage $d'$ flows back away from the upper end of said passage and assumes the level of the liquid glass in the chamber $d$ when the plunger is fully raised, thus preventing the clogging of the discharge-opening. The annular receiving-chamber is also a heating-chamber, being provided with means for keeping the temperature in the furnace F as a whole sufficiently high to retain the glass in a liquid condition.

It is obvious that, if preferred, the conduit $a$ may be extended through the annular heating-chamber $c$ and into the discharge-chamber $d$, in which case the result attained would be substantially the same, since the main function of the side walls of the chamber $d$ is to confine the melted glass and to guide and support the plunger.

The chambers $c$ and $d$ and the upper end of the discharge-passage $d'$ may be kept hot by jets of vapor and air, as by means of the well-known oil-jets used for similar purposes, (illustrated symbolically at $h\ h\ h$.)

What I claim as my invention, and desire to secure by Letters Patent, is—

1. The combination of a primary glass-furnace A, a supplementary furnace F, connected with the primary furnace A, by a conduit $a$, means for heating said supplementary furnace, a discharge-chamber $d$, in said supplementary furnace having one or more inlets for the melted glass, a discharge-passage $d'$, opening into the lower part of the discharge-chamber $d$, and extending above the plane of inlet thereto, and a plunger P, in said discharge-chamber $d$, supported laterally by the walls thereof and capable of depression below the plane of inlet for the purpose of positively ejecting the glass from the lower portion of the discharge-chamber, substantially as set forth.

2. The combination of a primary glass-furnace A, a supplementary furnace F, connected with the primary furnace by a conduit $a$, means for heating said supplementary furnace F, an annular chamber $c$, in the supplementary furnace F, into which the conduit $a$, opens, a central discharge-chamber $d$, in the supplementary furnace F, having ports $b, b$, connecting it with the annular chamber $c$, a discharge-passage $d'$, opening into the lower part of the discharge-chamber $d$, and extending above the level of the inlet-ports $b, b$, and a plunger P, in said discharge-chamber $d$, supported laterally by the walls thereof and capable of depression below said inlet-ports $b, b$, for the purpose of positively ejecting the glass from the lower portion of the discharge-chamber, substantially as set forth.

CHARLES W. FOSTER.

Witnesses:
D. W. GARDNER,
GEO. WM. MIATT.